US009533736B2

(12) United States Patent
Watarai et al.

(10) Patent No.: US 9,533,736 B2
(45) Date of Patent: Jan. 3, 2017

(54) BICYCLE DRIVE UNIT

(71) Applicant: Shimano Inc., Sakai, Osaka (JP)

(72) Inventors: Etsuyoshi Watarai, Sakai (JP); Satoshi Shahana, Sakai (JP); Shinichiro Noda, Sakai (JP)

(73) Assignee: SHIMANO INC., Osaka (JP)

(*) Notice: Subject to any disclaimer, the term of this patent is extended or adjusted under 35 U.S.C. 154(b) by 97 days.

(21) Appl. No.: 14/510,118

(22) Filed: Oct. 9, 2014

(65) Prior Publication Data

US 2016/0101826 A1    Apr. 14, 2016

(51) Int. Cl.
*B62M 9/135* (2010.01)
*H02K 5/22* (2006.01)
*B62M 6/55* (2010.01)

(52) U.S. Cl.
CPC .............. *B62M 9/135* (2013.01); *B62M 6/55* (2013.01); *H02K 5/22* (2013.01)

(58) Field of Classification Search
CPC ............ B62M 9/135; B62M 6/55; H02K 5/22
USPC .......................................................... 474/80
See application file for complete search history.

(56) References Cited

U.S. PATENT DOCUMENTS

| 6,146,298 | A  | * | 11/2000 | Nanko ................... B62M 9/135 |
| | | | | 474/127 |
| 6,352,131 | B1 | * | 3/2002 | Lin .......................... B62M 6/55 |
| | | | | 180/206.4 |
| 7,338,059 | B2 | * | 3/2008 | Sugimoto ............ B62K 25/005 |
| | | | | 180/206.4 |
| 8,186,244 | B2 | * | 5/2012 | Matsumoto .............. B62M 6/55 |
| | | | | 74/606 R |
| 9,156,525 | B2 | * | 10/2015 | Emura ................... B62M 9/135 |
| 2007/0117666 | A1 | * | 5/2007 | Ichida .................... B62M 9/135 |
| | | | | 474/80 |
| 2008/0026888 | A1 | * | 1/2008 | Yamamoto ........... B62M 9/1342 |
| | | | | 474/80 |
| 2011/0304200 | A1 | * | 12/2011 | Saida ..................... B62M 25/08 |
| | | | | 307/9.1 |
| 2013/0192405 | A1 | * | 8/2013 | Katsura .................. B62M 25/08 |
| | | | | 74/473.12 |
| 2014/0137696 | A1 | * | 5/2014 | Kosaka .................. B62M 25/08 |
| | | | | 74/523 |
| 2014/0290412 | A1 | * | 10/2014 | Emura ................... B62M 25/08 |
| | | | | 74/473.12 |

FOREIGN PATENT DOCUMENTS

| JP | 2012-096614 A | 5/2012 |
| JP | 2013-517176 A | 5/2013 |
| WO | 2011/088722 A1 | 7/2011 |

* cited by examiner

*Primary Examiner* — Tony Winner
*Assistant Examiner* — Marlon A Arce

(57) ABSTRACT

A bicycle drive unit includes a motor, which outputs assist force in correspondence with human-powered drive force applied to a crankshaft, and a housing, in which the motor is arranged. The housing includes a coupler, to which a derailleur can be coupled.

20 Claims, 7 Drawing Sheets

BICYCLE DRIVE UNIT

TECHNICAL FIELD

The present invention relates to a bicycle drive unit including a motor that outputs assist force in correspondence with human-powered drive force applied to a crankshaft.

BACKGROUND

Japanese National Phase Laid-Open Patent Publication No. 2013-517176 describes a known drive unit including a motor that outputs assist force in correspondence with human-powered drive force applied to a crankshaft.

A conventional front derailleur is coupled to the frame.

SUMMARY

It is an object of the present invention to provide a bicycle drive unit that can be coupled to a derailleur.

A first aspect of the present invention is a bicycle drive unit including a motor that outputs assist force in correspondence with human-powered drive force applied to a crankshaft, and a housing on which a coupler is arranged. A derailleur can be coupled to the coupler.

In one example, the coupler is formed separately from the housing.

In one example, the coupler is coupled to the housing in a removable manner.

In one example, the coupler is coupled to the housing by a fastening member.

In one example, the coupler includes a first adjustment section configured to adjust a position of the coupler relative to the housing.

In one example, the first adjustment section allows for adjustment of the position of the coupler in at least a direction in which the crankshaft extends.

In one example, the first adjustment section includes an elongated hole or a plurality of holes.

In one example, the coupler is formed integrally with at least a portion of the housing.

In one example, the coupler includes a coupling mechanism to which the derailleur is coupled in a removable manner.

In one example, the coupling mechanism includes a second adjustment section configured to adjust a coupling position of the external gearshift device relative to the coupler.

In one example, the second adjustment section allows the position of the external gearshift device to be adjusted in at least a direction extending toward the crankshaft and a direction extending away from the crankshaft.

In one example, the second adjustment section includes an elongated hole or a plurality of holes.

In one example, a link shaft of a link mechanism included in the derailleur can be coupled to the coupler.

In one example, the link mechanism includes an outer link and an inner link, the coupler includes a hole or a groove that receives the link shaft to which the outer link and the inner link are coupled.

In one example, the housing includes an output portion to which a plurality of front sprockets can be coupled.

In one example, the output portion projects from one wall of the housing located in the direction in which the crankshaft extends, and the coupler is located proximate to the one wall.

In one example, the output portion and the crankshaft are coaxial.

In one example, the coupler includes a first portion, which is coupled to the housing, a second portion, to which the derailleur can be coupled, and a connecting portion, which connects the first portion and the second portion. The connecting portion includes a first side surface and a second side surface, which is a surface on a side opposite to the first side surface. The first portion is formed on the same side as the first side surface. The second portion is formed on the same side as the second side surface.

One example further includes the crankshaft arranged on the housing.

One example further includes the derailleur to which the coupler is coupled.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF EMBODIMENTS

First Embodiment

Figure 1:
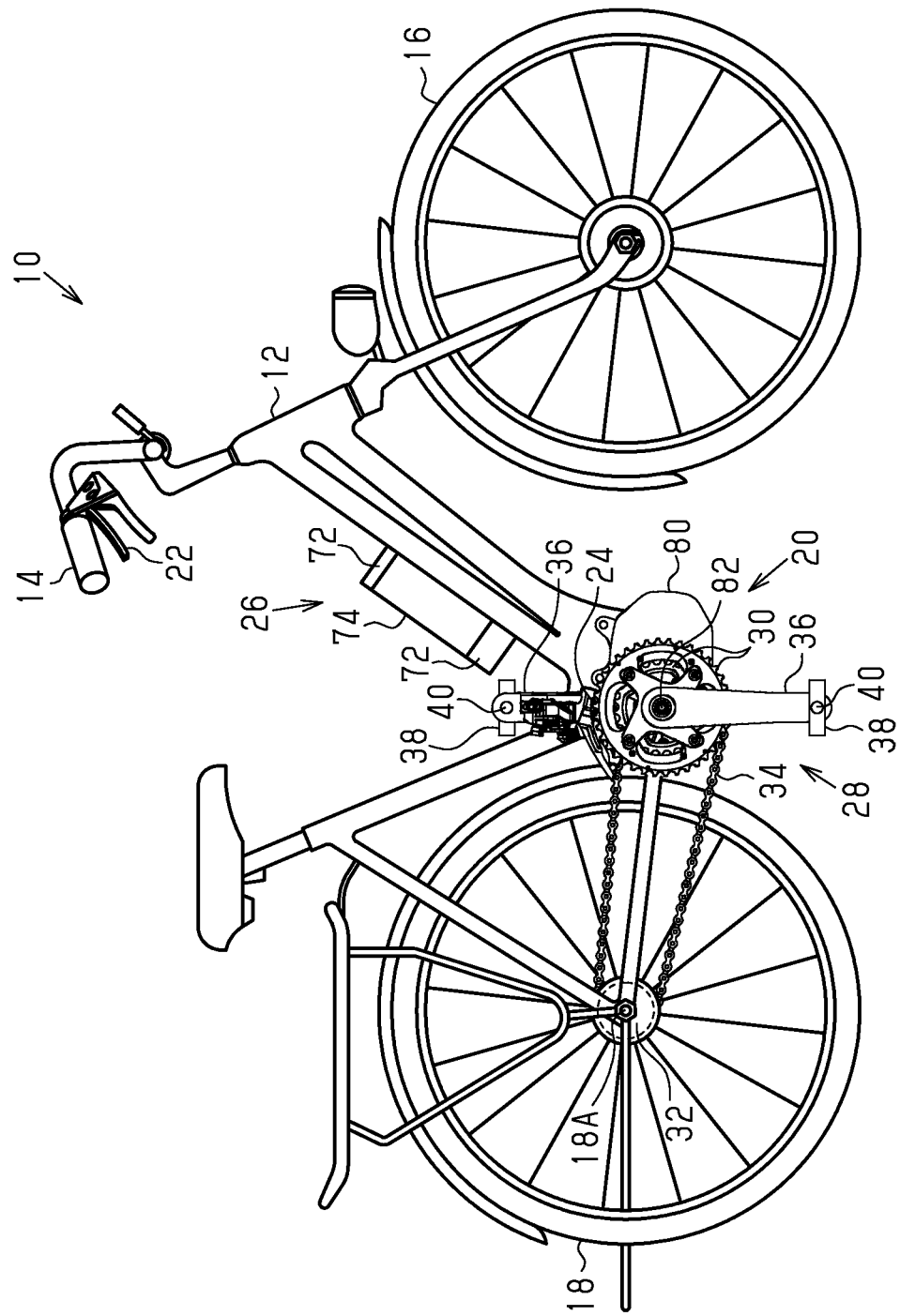
FIG. 1 is a side view of a bicycle including a drive unit according to a first embodiment.

The structure of a bicycle 10 including a bicycle drive unit will now be described with reference to FIG. 1.

A bicycle 10 includes a frame 12, a handlebar 14, a front wheel 16, a rear wheel 18, a drive mechanism 20, a gearshift control unit 22, a derailleur 24, a battery unit 26, and a drive unit 80.

The drive mechanism 20 includes a crankset 28, front sprockets 30, a rear sprocket 32, and a chain 34.

The crankset 28 includes left and right crankarms 36 and a crankshaft 82. The left and right crankarms 36 are coupled to the crankshaft 82, which is included in the drive unit 80. A pedal 40 includes a pedal shaft 38 and a pedal body, which is rotationally supported by the pedal shaft 38. The pedal shaft 38 is supported by the crankarm 36.

Figure 2:
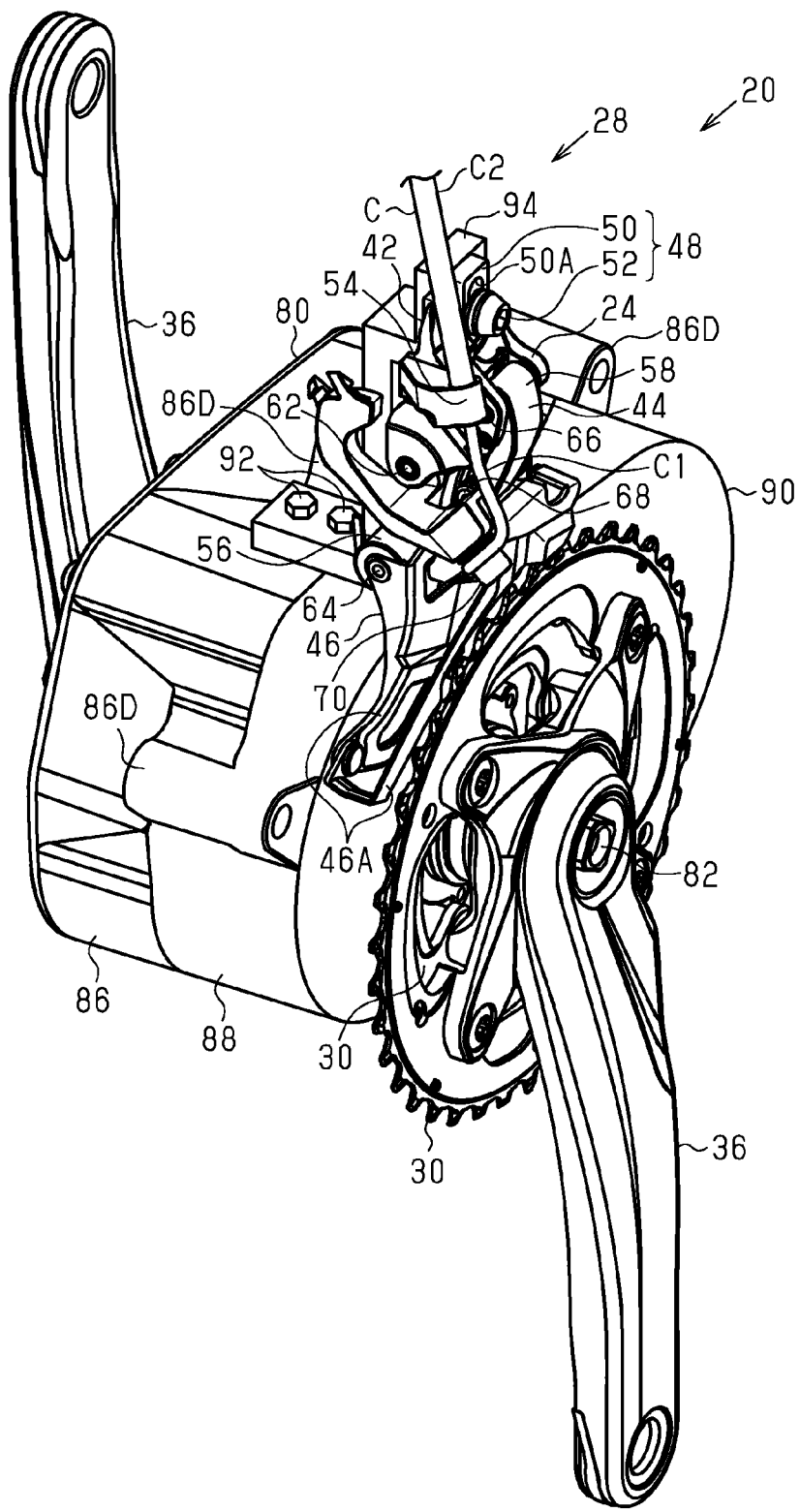
FIG. 2 is a perspective view of the drive unit shown in FIG. 1.

As shown in FIG. 2, the front sprockets 30 differ from each other in the number of teeth and diameter. The front sprockets 30 are coupled to an output portion 84 (refer to FIG. 3) of a drive unit 80, which is coaxial with the crankshaft 82. In this case, two front sprockets 30 are coupled to the output portion 84 (refer to FIG. 3). However, three or more front sprockets may be coupled to the output portion 84.

As shown in FIG. 1, the rear sprocket 32 is coupled to be rotatable about an axle 18A of the rear wheel 18. A one-way clutch (not shown) couples the rear sprocket 32 to the rear wheel 18. A chain 34 runs about one of the front sprockets 30 and the rear sprocket 32. Human-powered drive force is applied to the pedal 40 to rotate the crankset 28. This rotates the rear wheel 18 through the front sprocket 30, the chain 34, and the rear sprocket 32. The drive mechanism 20 may include at least one of an internal gearshift device and a rear derailleur. When the drive mechanism 20 includes an internal gearshift device, the internal gearshift device is arranged on a hub shaft of the rear wheel 18. When the drive mechanism 20 includes an internal gearshift device, the rear sprocket 32 is replaced by a plurality of rear sprockets, and a derailleur is coupled to a rear end of the frame 12. The drive mechanism 20 may include any gearshift mechanism at the side of the rear wheel 18.

The gearshift control unit 22 is coupled to the handlebar 14. A cable C (refer to FIG. 2) connects the gearshift control unit 22 to the derailleur 24. The cable C is a Bowden cable. When an operator operates the gearshift control unit 22, an inner cable C1 of the cable C (refer to FIG. 2) moves and operates the derailleur 24.

As shown in FIG. 2, the derailleur 24 is a front derailleur. The derailleur 24 includes a base member 42, a connecting mechanism 44, and a movable member 46.

The base member 42 includes a fastening portion 48, which is configured to couple the derailleur 24 to a housing 86 of the drive unit 80. The fastening portion 48 includes a plate 50 and a bolt 52, which is inserted through an elongated hole 50A formed in the plate 50. The base member 42 further includes a guide 54 that positions an outer cable C2 of the cable C and guides the inner cable C1.

The connecting mechanism 44 connects the base 42 and the movable member 46 so as to be movable relative to each other. The connecting mechanism 44 includes an inner link 56, an outer link 58, four link shafts 62, 64, 66, and 68, and a fastening portion 70.

The inner link 56 couples the base member 42 and the movable member 46 with the link shafts 62 and 64. One end of the inner link 56 is coupled to the base member 42 by the link shaft 62. The inner link 56 can be rotated about the link shaft 62 relative to the base member 42. The other end of the inner link 56 is coupled to the movable member 46 by the link shaft 64. The inner link 56 can be rotated about the link shaft 64 relative to the movable member 46.

The outer link 58 couples the base member 42 and the movable member 46 with the link shafts 66 and 68. One end of the outer link 58 is coupled to the base member 42 by the link shaft 66. The outer link 58 can be rotated about the link shaft 66 relative to the base member 42. The other end of the outer link 58 is coupled to the movable member 46 by the link shaft 68. The outer link 58 can be rotated about the link shaft 68 relative to the movable member 46.

The connecting mechanism 44 includes a spring (not shown). The spring biases the movable member 46 to low normal or top normal. The spring is arranged, for example, around the link shaft 64 at the movable member side end of the inner link 56.

The fastening portion 70 is coupled to the inner link 56. The fastening portion 70 is fixed to the end of the inner cable C1 of the cable C that has been guided by the guide 54.

The inner link 56 and the outer link 58 couples the movable member 46 to the base member 42 in a manner allowing for relative movement. The movable member 46 includes two plates 46A. A slot formed between the two plates 46a guides the chain 34 (refer to FIG. 1).

The derailleur 24 changes the gear ratio by changing the front sprocket 30 around which the chain 34 shown in FIG. 1 runs.

Operation of the gearshift control unit 22 moves the inner cable C1 of the cable C shown in FIG. 2 and rotates the inner link 56 and the outer link 58 about the link shafts 62, 64, 66, and 68 with the fastening portion 70. The rotation of the inner link 56 and the outer link 58 moves the movable member 46 toward the frame 12 or away from the frame 12. As a result, the plates 46A guide the chain 34 (refer to FIG. 1) and changes the front sprocket 30 around which the chain 34 runs.

As shown in FIG. 1, a battery holder 72 fixes the battery unit 26 to the frame 12. The battery unit 26 includes a battery 74, which is formed by one or more battery cells. The battery 74 is a rechargeable battery. The battery 74 is electrically connected to the drive unit 80 and supplies the drive unit 80 with power.

As shown in FIG. 2, the drive unit 80 includes the crankshaft 82, the output portion 84 (refer to FIG. 3), the housing 86, a cover 88, and a motor 90. The motor 90 may be arranged in the housing 86, partially exposed from the housing 86, or coupled to the housing 86 outside the housing 86.

Figure 3:
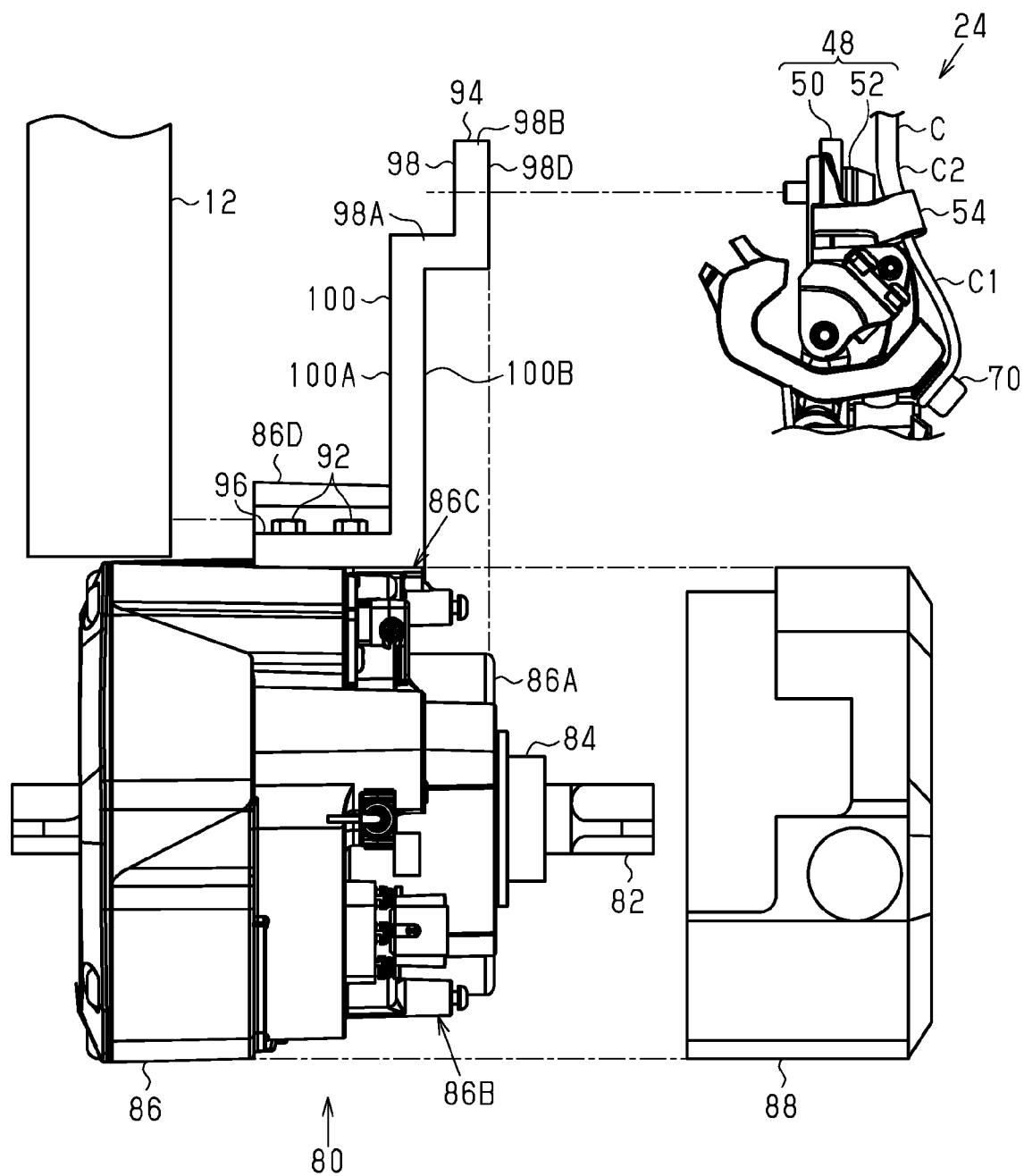
FIG. 3 is a side view showing the relationship of the drive unit, a derailleur, and a frame.

As shown in FIG. 3, the output portion 84 is arranged on the outer circumference of the crankshaft 82 coaxially with the crankshaft 82. The output portion 84, which is partially arranged in the housing 86, includes an end projecting from one of the walls 86A of the housing 86 in the direction in which the crankshaft 82 extends. The output portion 84 is supported by the housing 86 to be movable relative to the housing 86. The output portion 84 may be rotatable relative to the crankshaft 82. The front sprockets 30 (refer to FIG. 2) are coupled to the end of the output portion 84.

As shown in FIG. 2, the motor 90 is arranged at the outer side of the crankshaft 82 and the output portion 84 in the radial direction. The axial direction of the motor 90 is parallel to the direction in which the crankshaft 82 extends. The motor 90 is connected to the output portion 84 by a reduction drive (not shown). The motor 90 outputs assist force in correspondence with human-powered drive force applied to the crankshaft 82. A one-way clutch may be arranged in a motor power transmission pass between the motor 90 and the output portion 84 so that human-powered drive force does not generate rotation in the motor 90. Further, a one-way clutch may be arranged in a motor power transmission pass between the motor 90 and the output portion 84 to interrupt the transmission of human-powered drive force to the output portion when the rotation of the crankset 28 is reversed.

A sensor that detects human-powered drive force is arranged in the housing 86. The sensor is arranged in a pass through which drive force is transmitted from the crankshaft 82 to the output portion 84. The sensor may be realized by, for example, a strain sensor, a magnetostrictive sensor, an optical sensor, or a pressure sensor. The sensor that detects human-power drive force does not have to be arranged in the housing and may be configured to detect the human-powered drive force applied to, for example, the crankarms 36 or the pedal 40. As long as a signal corresponding to the human-powered drive force is output, the sensor may have any structure. A control unit (not shown) drives the motor 90 based on the output of the sensor. The control unit may be arranged in the drive unit 80 or outside the drive unit 80.

As shown in FIG. 3, the housing 86 includes a first portion 86B, which is located at a position close to the output portion 84 in the direction in which the crankshaft 82 extends, and a second portion 86C, which is located at a position far from the output portion 84. The periphery of the second portion 86C includes a plurality of fastening portions 86D, which are used to couple the drive unit 80 to the frame 12. The housing 86 is formed from a metal material including, for example, iron or aluminum. The cover 88 is arranged on the housing 86. The cover 88 is fixed, in a removable manner, to the second portion 86C in order to cover the first portion 86B of the housing 86. The cover 88 is formed from, for example, a resin material. The cover 88 is configured to cover electric connectors in the housing 86 and the electric wires connected to the electric connectors. The cover 88 may form a portion of the housing 86.

The housing 86 includes a coupler 94. The coupler 94 is configured to couple the derailleur 24 to the housing 86. The coupler 94 is a separate component, which is coupled in a removable manner to the housing 86, or a portion of the housing 86. In the first embodiment, the coupler 94 is formed separately from the housing 86. The coupler 94 is coupled in a removable manner by fastening members 92 to an end of the second portion 86C of the housing 86 proximate to the output portion 84 and proximate to the wall 86A of the housing 86. The fastening members 92 are formed by bolts. The coupler 94 may be referred to as a front derailleur bracket. The coupler 94 is formed from a metal material including, for example, iron or aluminum.

The coupler 94 includes a first portion 96, which is coupled to the housing 86, a second portion 98, to which the derailleur 24 can be coupled, and a connecting portion 100, which connects the first portion 96 and the second portion 98.

The first portion 96 extends in the direction in which the crankshaft 82 extends.

Figure 4:
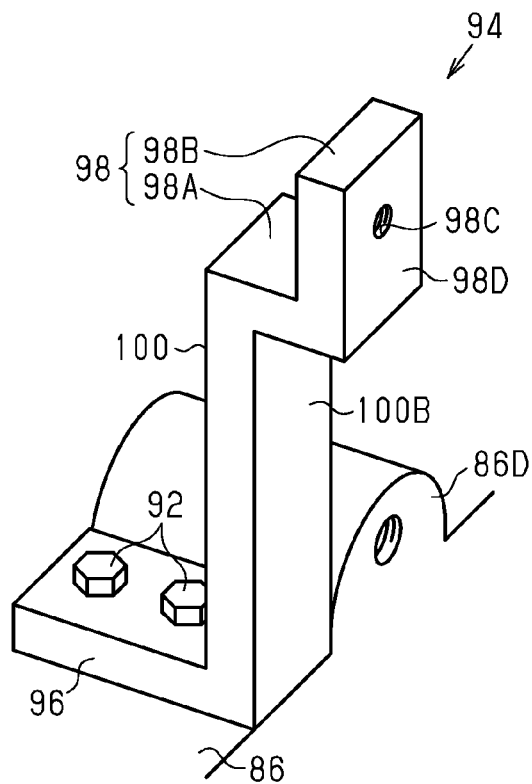
FIG. 4 is a perspective view showing a coupler of the drive unit.

The second portion 98 includes a basal section 98A, which is continuous with the connecting portion 100, and a distal section 98B. The basal section 98A extends in the direction in which the crankshaft 82 extends. The distal section 98B extends in a direction orthogonal to the direction in which the crankshaft 82 extends. Thus, the second portion 98 is L-shaped and the basal section 98A is orthogonal to the distal section 98B. As shown in FIG. 4, the coupler 94 includes a coupling mechanism 98C to which the derailleur 24 is coupled in a removable manner. The coupling mechanism 98C is located in the distal section 98B. The coupling mechanism 98C is a female thread that receives the bolt 52 (refer to FIG. 2). Referring to FIG. 3, an end surface 98D of the distal section 98B contacts the derailleur 24 and is parallel to a surface orthogonal to the crankshaft 82.

The connecting portion 100 extends away from the crankshaft 82. The connecting portion 100 includes a first side surface 100A and a second side surface 100B, which is the surface on the side opposite to the first side surface 100A. The first portion 96 is formed on the same side as the first side surface 100A. The second portion 98 is formed on the same side as the second side surface 100B.

The drive unit 80 of the first embodiment has the effects and advantages described below.

(1) The drive unit 80 includes the coupler 94 on the housing 86. The sprockets 30 are coupled to the drive unit 80. Thus, by coupling the derailleur 24 to the coupler 94, the derailleur 24 can be positioned relative to the front sprockets 30.

(2) When using a coupler that can couple the derailleur 24 to the frame 12, the shape of the frame 12 will be limited. The drive unit 80 of the present embodiment includes the coupler 94. This increases the degree of freedom for the frame 12.

(3) The drive unit 80 includes the motor 90. This enlarges the drive unit 80 in the direction in which the crankshaft 82 extends. When the size of the drive unit 80 in the direction in which the crankshaft 82 extends is greater than the size of the frame 12 in the same direction, the front sprockets 30 may be distanced from the frame 12.

In the present embodiment, the derailleur 24 can be coupled to the drive unit 80. Thus, the derailleur 24 can be coupled to the bicycle 10 even when the front sprockets 30 are distanced from the frame 12.

(4) The coupler 94 is formed separately from the housing 86. This allows the coupler 94 and the housing 86 to be formed from suitable materials.

(5) The coupler 94 is coupled in a removable manner to the housing 86. Thus, the coupler 94 may be replaced by a coupler 94 having a different shape to conform with the type or the like of the derailleur 24. This improves the versatility of the drive unit 80.

(6) The coupler 94 is coupled to the housing 86 by the fastening members 92, which are removable or separable from the coupler 94. This allows for easy coupling and separation of the coupler 94 and the housing 86.

(7) The coupler 94 includes the coupling mechanism 98C used to couple the derailleur 24 in a removable manner. Thus, after coupling the derailleur 24, the derailleur 24 can be removed to undergo maintenance or replacement. Further, in comparison with when using other members, the number of components can be reduced.

Second Embodiment

Figure 5:
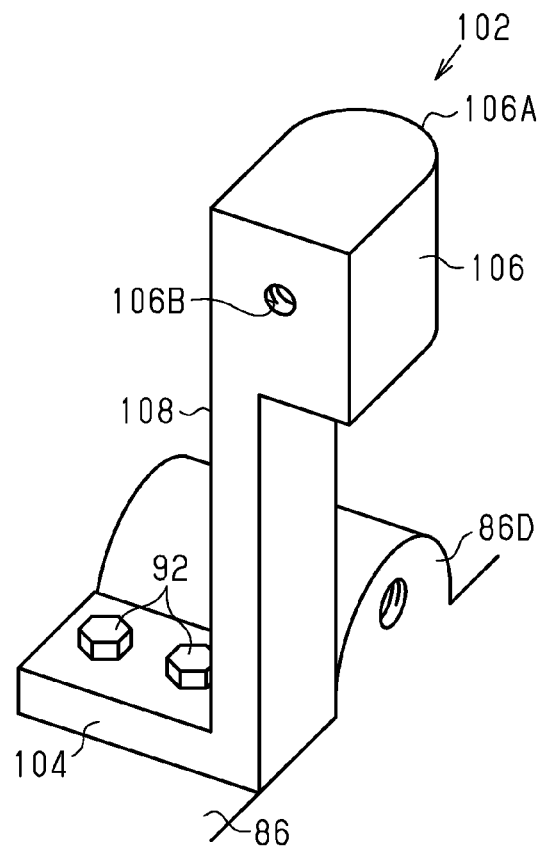
FIG. 5 is a perspective view showing a coupler of a drive unit according to a second embodiment.
Figure 6:
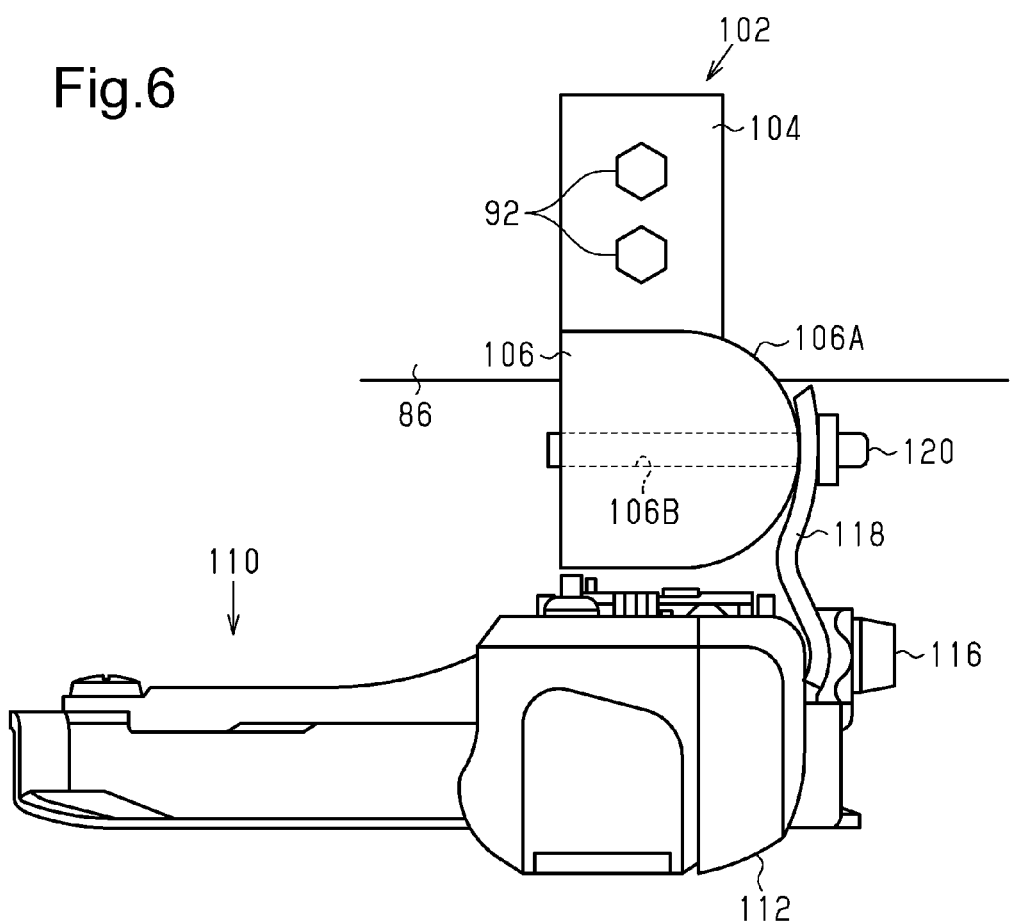
FIG. 6 is a plan view taken when a derailleur is coupled to the drive unit including the coupler shown in FIG. 5.

The bicycle 10 of the present embodiment includes a drive unit 80 that includes a coupler 102, which is shown in FIG. 5, and a motor-driven derailleur 110, which is shown in FIG. 6.

As shown in FIG. 5, the coupler 102 includes a first portion 104, which is coupled to the housing 86, a second portion 106, which can be coupled to the derailleur 24, and a connecting portion 108, which connects the first portion 104 and the second portion 106.

The first portion 104 extends in the direction in which the crankshaft 82 (refer to FIG. 2) extends.

The connecting portion 108 extends away from the crankshaft 82.

The second portion 106 includes a curved side surface 106A. The second portion 106 includes a coupling mechanism 106B, which is used to couple the derailleur 110 in a removable manner. The coupling mechanism 106B is a female thread.

As shown in FIG. 6, a base member 112 of the derailleur 110 has an oblong rectangular form. A motor (not shown) is incorporated in the base 112 to operate the connecting mechanism 44. A first bolt 116 is coupled to the side surface of the base member 112. One end of a spacer 118 is held between a side surface of the base member 112 and the first bolt 116. The other end of the spacer 118 includes a hole through which a second bolt 120 is inserted. Further, the other end of the spacer 118 is shaped in conformance with the side surface 106A of the second portion 106. The second bolt 120 is inserted through the hole of the spacer 118 and fastened to the coupling mechanism 106B to couple the derailleur 110 to the coupler 102 in a removable manner. The drive unit 80 of the second embodiment has the following advantage in addition to advantages (1) to (7) of the first embodiment.

(8) The side surface 106A of the second portion 106 is curved. Thus, the use of the spacer 118, which is for coupling to a tubular frame, allows the derailleur 110 to be coupled to the drive unit 80. Thus, the conventional spacer 118 can be used to couple the derailleur 110 to the drive unit 80. This increases convenience as compared with when using a dedicated spacer or the like to couple the derailleur 110 to the drive unit 80.

Third Embodiment

Figure 7:
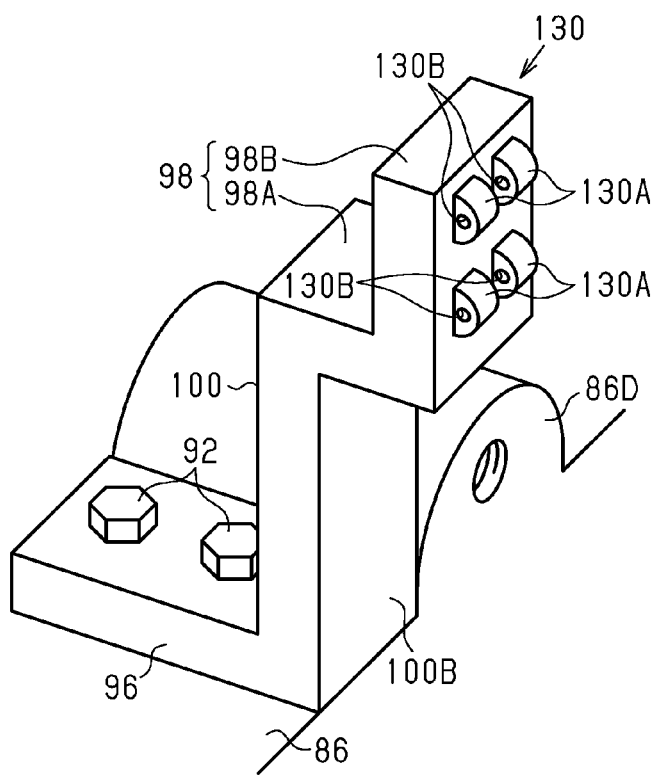
FIG. 7 is a perspective view showing a coupler of the drive unit according to a third embodiment.
Figure 8:
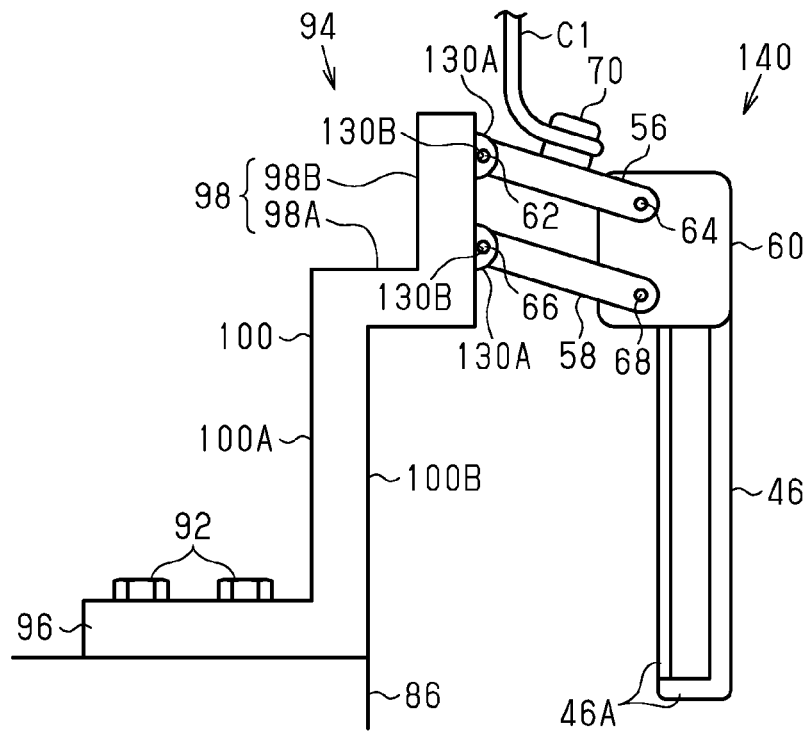
FIG. 8 is a schematic diagram taken when a derailleur is coupled to the drive unit including the coupler shown in FIG. 7.

The bicycle 10 of the present embodiment includes a drive unit 80 that includes a coupler 130, which is shown in FIG. 7, and a derailleur 140, which is shown in FIG. 8.

As shown in FIG. 7, the coupler 130 includes a first portion 96, which is coupled to the housing 86, a second portion 98, which can be coupled to the derailleur 24, and a connecting portion 100, which connects the first portion 96 and the second portion 98.

The distal section 98B includes a coupling mechanism 130A coupled to a link shaft 62 and a link shaft 64 of the derailleur 140 shown in FIG. 8. The coupling mechanism 130A includes four projections projecting toward the front sprockets 30 (refer to FIG. 2). Each projection includes a hole 130B extending parallel to a plane orthogonal to the crankshaft 82.

As shown in FIG. 8, the derailleur 140 includes a connecting mechanism 44 and a movable member 46. The link shaft 62 and the link shaft 66 are inserted into holes 130B of the coupling mechanism 130A. This rotationally couples the inner link 56 and the outer link 58 to the coupler 130.

In addition to advantages (1) to (7) of the first embodiment, the drive unit 80 of the third embodiment has the following advantage.

(9) The link shafts 62 and 66 of the derailleur 140 are coupled to the coupler 130. That is, the coupler 130 functions as the base member of the derailleur 140. This allows for a reduction in the number of components of the derailleur 140. The coupler 130 also functions as the base member of the derailleur 140. Thus, the derailleur 140 may be reduced in size.

MODIFIED EXAMPLES

Specific embodiments of the present drive unit are not limited to the examples of the above embodiments. The present drive unit may be embodied in various forms that differ from the above embodiments. Modified examples of the above embodiments described hereafter are examples of various forms of the present drive unit.

Figure 9:
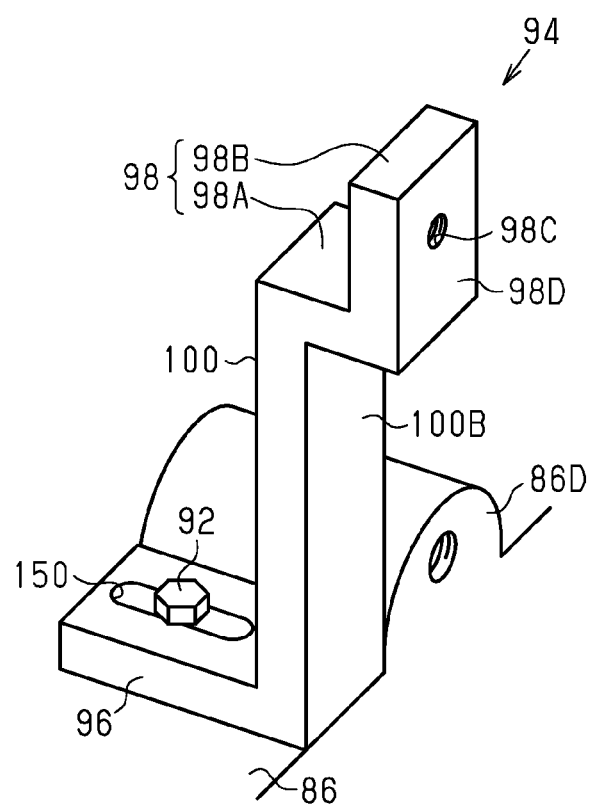
FIG. 9 is a perspective view showing a coupler of a drive unit according to a first modified example of the first embodiment.

As shown in FIG. 9, the first portion 96 may include a first adjustment section 150. The first adjustment section 150 is an elongated hole, which is elongated in the direction in which the crankshaft 82 extends. A fastening member 92 is inserted through the elongated hole of the first adjustment section 150 and coupled to the housing 86. In this case, the positional relationship of the fastening member 92 and the first adjustment section 150 is adjusted to adjust the position of the coupler 94 relative to the housing 86 in the direction in which the crankshaft 82 extends. This allows for more types of the derailleur 24 to be coupled to the coupler 94. The burden for positioning is also small in this case in comparison with when coupling the derailleur 24 to the frame 12.

The first adjustment section 150 may be an elongated hole that is elongated in the direction orthogonal to the direction in which the crankshaft 82 extends.

The first adjustment section 150 may include a plurality of holes.

Figure 10:
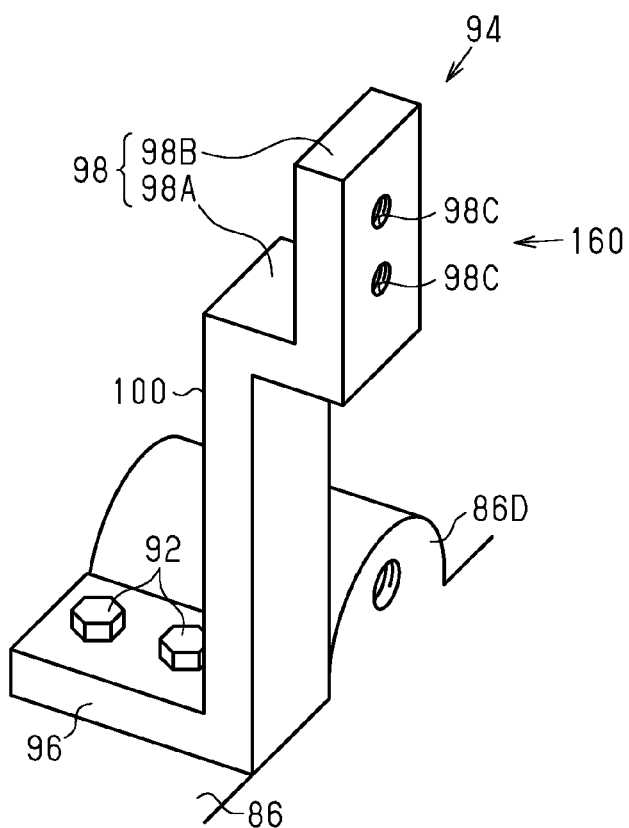
FIG. 10 is a perspective view showing a coupler of a drive unit according to a second modified example of the first embodiment.

As shown in FIG. 10, the second portion 98 may include a second adjustment section 160. The second adjustment section 160 is a plurality of coupling mechanisms 98C arranged in the direction in which the coupler 94 extends. In this case, by changing the coupling mechanism 98C that is fastened with the bolt 52, the location of the derailleur 24 may be adjusted to a position close to the crankshaft 82 and a position far from the crankshaft 82. This allows for more types of the derailleur 24 to be coupled to the coupler 94. The burden for positioning is also small in this case in comparison with when coupling the derailleur 24 to the frame 12.

The coupling mechanisms 98C of the second adjustment section 160 may be formed by an elongated hole.

The coupling mechanism 130A of the third embodiment may be a groove formed in the second portion 98. In this case, the link shafts 62 and 66 are rotationally fitted to the grooves.

Figure 11:
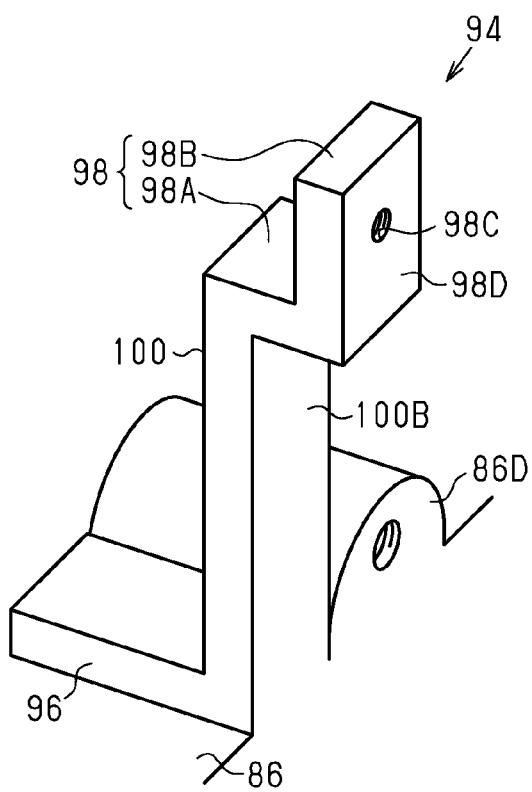
FIG. 11 is a perspective view showing a coupler of a drive unit according to a third modified example of the first embodiment.

The couplers 94, 102, and 130 may be formed integrally with the housing 86. The couplers 94, 102, and 130 may be welded and integrated with the housing 86. Alternatively, as shown in FIG. 11, the couplers 94, 102, and 130 may be casted or forged to be formed integrally with the housing 86. Further, the housing may be formed by a plurality of members, some formed integrally with the couplers 94, 102, or 130. In this case, the first portions 96 and 104 may be omitted, and the connecting portion 100 may be modified to directly project from the housing 86.

The coupler 94 may be a female thread formed in the wall 86A of the housing 86. In this case, the shape of the housing 86 may be changed.

The drive unit 80 may lack the crankshaft 82. In this case, a crankshaft, which is a separate member, is coupled to the drive unit 80.

The drive unit 80 may include the derailleur 24, 110, or 140. In other words, the drive unit includes the derailleur 24, 110, or 140 that is coupled to the motor 90, the housing 86, and the coupler 94, 102, or 130.

It should be apparent to those skilled in the art that the present invention may be embodied in many other specific forms without departing from the spirit or scope of the invention. For example, some of the components disclosed in the embodiments (one or more forms) may be omitted or combined. Therefore, the present examples and embodiments are to be considered as illustrative and not restrictive, and the invention is not to be limited to the details given herein, but may be modified within the scope and equivalence of the appended claims.

The invention claimed is:

1. A bicycle drive unit comprising:
a motor that outputs assist force in correspondence with human-powered drive force applied to a crankshaft; and
a housing on which a coupler is arranged, wherein the coupler includes a coupling mechanism to which a derailleur is coupled in a removable manner, and the coupling mechanism includes an adjustment section configured to adjust a coupling position of the derailleur relative to the coupler, and the housing on which the coupler is arranged is formed separately from a bicycle frame and is nonrotatable with respect to the bicycle frame.

2. The bicycle drive unit according to claim 1, wherein the coupler is formed separately from the housing.

3. The bicycle drive unit according to claim 1, wherein the coupler is coupled to the housing in a removable manner.

4. The bicycle drive unit according to claim 1, wherein the coupler is coupled to the housing by a fastening member.

5. The bicycle drive unit according to claim 1, wherein the coupler includes an end portion that contacts an outer surface of the housing, and the end portion includes an additional adjustment section configured to adjust a position of the coupler relative to the housing.

6. The bicycle drive unit according to claim 5, wherein the additional adjustment section allows for adjustment of the position of the coupler in at least a direction in which the crankshaft extends.

7. The bicycle drive unit according to claim 5, wherein the additional adjustment section includes an elongated hole or a plurality of holes.

8. The bicycle drive unit according to claim 1, wherein the coupler is formed integrally with at least a portion of the housing.

9. The bicycle drive unit according to claim 1, wherein the adjustment section allows the position of the derailleur to be adjusted in at least a direction extending toward the crankshaft and a direction extending away from the crankshaft.

10. The bicycle drive unit according to claim 1, wherein the adjustment section includes an elongated hole or a plurality of holes.

11. The bicycle drive unit according to claim 1; wherein the coupler is configured to couple to a link shaft of a link mechanism included in the derailleur.

12. The bicycle drive unit according to claim 11, wherein the link mechanism includes an outer link and an inner link, and
the coupler includes a hole or a groove that receives the link shaft to which the outer link and the inner link are coupled.

13. The bicycle drive unit according to claim 1, wherein the housing includes an output portion configured to couple to a plurality of front sprockets.

14. The bicycle drive unit according to claim 13, wherein the output portion and the crankshaft are coaxial.

15. The bicycle drive unit according to claim 1, wherein the coupler includes a first portion coupled to the housing, a second portion configured to couple to the derailleur, and a connecting portion connecting the first portion and the second portion;
the connecting portion includes a first side surface and a second side surface, which is a surface on a side opposite to the first side surface;
the first portion is formed on the same side as the first side surface; and
the second portion is formed on the same side as the second side surface.

16. The bicycle drive unit according to claim 1, further comprising the crankshaft arranged on the housing.

17. The bicycle drive unit according to claim 1, further comprising the derailleur to which the coupler is coupled.

18. A bicycle drive unit comprising:
a motor that outputs assist force in correspondence with human-powered drive force applied to a crankshaft;
a housing on which a coupler, the motor and the crankshaft are mounted; and
two plates mounted on the housing to form a slot therebetween, wherein
the slot is configured to solely and exclusively receive a chain to guide the chain,
the coupler includes a coupling mechanism to which the two plates are coupled in a removable manner,
the coupling mechanism includes an adjustment section configured to adjust a coupling position of the two plates relative to the coupler, and
the housing on which the coupler is arranged is formed separately from a bicycle frame and is nonrotatable with respect to the bicycle frame.

19. A bicycle drive unit comprising:
a housing configured to rotatably support a crankshaft;
a motor mounted on the housing and configured to output assist force in correspondence with human-powered drive force applied to the crankshaft; and
a coupler arranged on the housing and including a coupling mechanism to which a front derailleur is coupled in a removable manner, wherein the housing on which the coupler is arranged is formed separately from a bicycle frame and configured to be attached on the bicycle frame and is nonrotatable with respect to the bicycle frame.

20. A bicycle drive unit comprising:
a motor that outputs assist force in correspondence with human-powered drive force applied to a crankshaft;
a housing including an output portion configured to couple to a plurality of front sprockets; and
a coupler arranged on the housing and configured to couple to a derailleur, wherein
the output portion projects from one wall of the housing located in the direction in which the crankshaft extends, and
the coupler is located proximate to the one wall.

* * * * *